May 8, 1923.

V. M. CABRETOSA

SOLID TIRE FOR WHEELS

Filed Dec. 4, 1922

1,454,103

Inventor
V. M. Cabretosa
by Langner, Parry, Card & Langner
Attys.

Patented May 8, 1923.

1,454,103

UNITED STATES PATENT OFFICE.

VALENTIN MARTI CABRETOSA, OF BARCELONA, SPAIN.

SOLID TIRE FOR WHEELS.

Application filed December 4, 1922. Serial No. 604,882.

*To all whom it may concern:*

Be it known that I, VALENTIN MARTI CABRETOSA, subject of the King of Spain, residing at Barcelona, Spain, have invented certain new and useful Improvements in Solid Tires for Wheels, of which the following is a specification.

The invention relates to solid india-rubber tires in which for the sake of cooling the tire, in the interior of the india-rubber substance, cavities in connection with the open air are provided. According to the invention, in order to facilitate the exchange of air as well as to stiffen the tire, loose piston-shaped bodies of india-rubber are introduced into the cavities, which bodies may be furnished with grooves the same as the inner walls of the cavities, and, what is more, the bodies of india-rubber have transverse grooves and the cavities longitudinal grooves, or vice-versa, whereby the grooves cross each other. By this means shifting of the bodies of india-rubber within the cavities is permitted without interfering with the free exchange of air, while the effective cooling-surfaces are simultaneously increased.

The annexed drawing gives an example of the mode of construction of the wheel-tire in accordance with the present invention.

Figure 1:
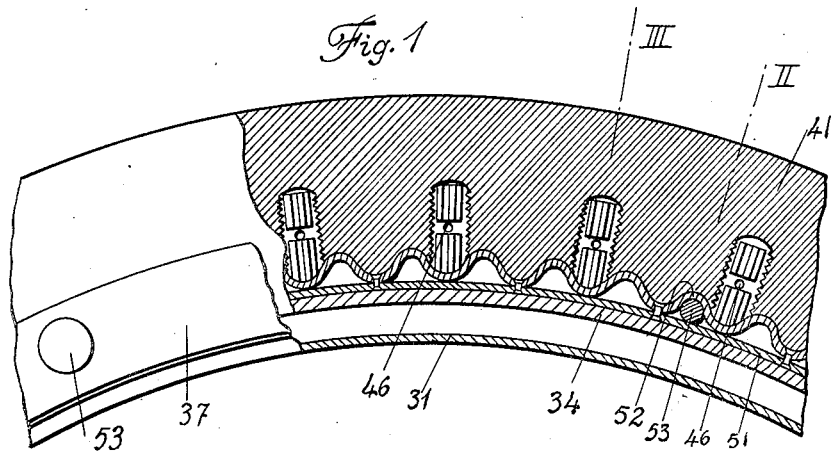
Fig. 1 shows a portion of the tire, partly in elevation, and partly in longitudinal section.
Figure 2:
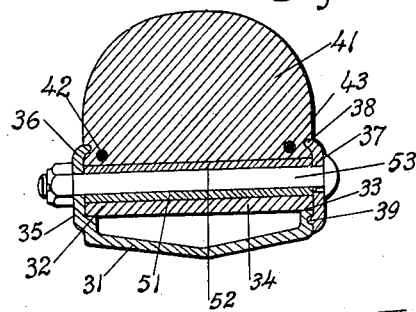
Fig. 2 is a transverse section on line II of Fig. 1.
Figure 3:
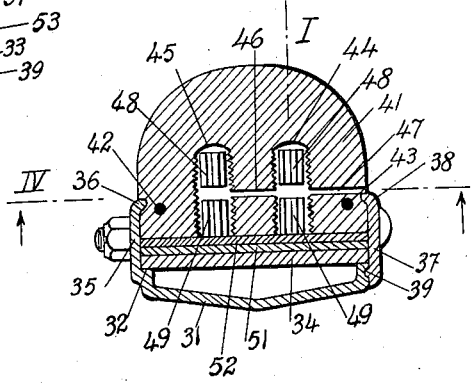
Fig. 3 is a transverse section on line III of Fig. 1.
Figure 4:
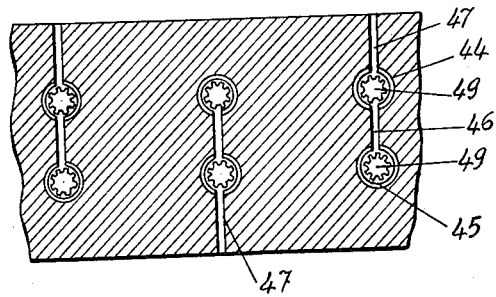
Fig. 4 is a transverse section on line IV of Fig. 3.

The india-rubber tire —41— is placed by means of a steel tire —34— and two straps —51— and —52— on the felly —31—. Of the two steel straps the outer —52— is shaped in an undulated form and jointed with the inner —51— by a rivet or any other analogous means. The india-rubber body —41— catches with corresponding undulations into the undulations of the steel strap —52—. In this manner a mutual displacement between the india-rubber tire and the steel strap support, with respect to the felly, is avoided. The connection with the felly is effected by means of two flanges —35— and —37—, of which the former is integral with the felly —31—, while flange —37— is pressed sideways against the felly by the screw bolt —53—, whereby it compresses the india-rubber tire —41— between the two flanges. The linking bolts —53— are, as can be seen from Fig. 1, received in the cavities formed by the undulations of the steel strap —52—.

The india-rubber tire —41— is furnished with two or more series of radially directed, substantially cylinder-shaped cavities —44— and —45—, which extend to the inner surface of the tire. The cavities placed in the same transverse plane are connected by cross-channels —46—. Furthermore the cavities are in communication with the open air by lateral channels —47—. The channels —47— in the successive groups of cavities —44— and —45— are arranged in such a manner as to alternately discharge on the one and on the other side of the tire.

In each of the cavities —44— and —45— cylindrical india-rubber bodies —48— and —49— are arranged, which do not completely fill the cavities in a longitudinal direction. The longitudinal space left by the india-rubber bodies corresponds approximately to the diameter of the channels —46— and —47—. The inner walls of the cavities —44— and —45— are screw threaded, while the india-rubber bodies —48— and —49— are externally longitudinally fluted or grooved. Thus access of air is made easy and also the effective cooling surface is increased by said grooves. These india-rubber bodies —48— and —49— might however be furnished with cross grooves and the walls of the cavities —44— and —45— with longitudinal grooves.

The arrangement of the members —48— and —49—, which do not necessarily have to be applied in pairs to the cavities, act to strengthen the tire —41—, which because of cavities 44 and 45 naturally loses part of its resisting power, and at the same time do not interfere with cooling by the effective exchange of air. If great pressure is put upon the tire, then the cavities —44— and —45— will be compressed and be more or less completely filled by the india-rubber bodies they contain, whereby the tire has an increased resistance equal to a solid india-rubber tire without any cavities. On release of pressure, the cavities will again expand and the india-rubber bodies resume their normal spaced position when outside air will be sucked in through the channels —46— and —47—. An active exchange of heat, and very effective cooling of the tire, will result.

I claim:

1. A solid india-rubber tire for vehicles, having a series of cavities in its interior, channels communicating said cavities with the atmosphere, and separate india-rubber members positioned in and partly filling said cavities.

2. A solid india-rubber tire for vehicles, having a series of cylindrical cavities disposed in the same, which cavities communicate with the atmosphere by means of channels and india-rubber pieces of cylindrical shape partially filling said cavities.

3. A solid india-rubber tire for vehicles, having a series of cylindrical cavities in the interior of the same, which cavities are furnished with spiral furrows, channels putting certain of these cavities into communication between themselves and also with the exterior, and cylindrical bodies with their surface fluted lengthwise, loosely arranged in the interior of said cavities and partly filling the same.

In testimony whereof I have signed my name to this specification.

VALENTIN MARTI CABRETOSA.